United States Patent [19]
Leschenne

[11] 3,715,939
[45] Feb. 13, 1973

[54] AUTOMATIC LATHE

[75] Inventor: Henri Leschenne, Moutier, Switzerland

[73] Assignee: Fabrique de Machines Andre Bechler S.A., Moutier (Canton of Berne), Switzerland

[22] Filed: Aug. 30, 1971

[21] Appl. No.: 176,074

[30] Foreign Application Priority Data

Sept. 4, 1970 Switzerland..................13241/70

[52] U.S. Cl. ..................................82/21 B, 82/21 A
[51] Int. Cl......................................................B23b
[58] Field of Search.....82/21 R, 21 A, 21 B; 29/37 A

[56] References Cited

UNITED STATES PATENTS

| 3,330,173 | 7/1967 | Hirshfeld et al. | 82/21 A |
|---|---|---|---|
| 2,801,617 | 8/1957 | Lelan | 82/21 B |

Primary Examiner—Leonidas Vlachos
Attorney—Werner W. Kleeman

[57] ABSTRACT

An automatic lathe equipped with a mechanism rendering possible interruption of the rotation of a control shaft during a machining cycle, this control shaft being equipped with at least one cam disc fixedly seated thereon controlling the movement of given tools. There is provided at least one device for carrying out at least one working or machining operation by means of at least one predetermined tool during standstill of the control shaft. This device embodies at least one element for bringing about the feed of such predetermined tool and there is also provided a mechanism which controls the speed of feed movement of this tool or the duration of the machining operation carried out by such tool. There is additionally provided a response or feeler means, for instance a microswitch, and associated operable connection means in order to place again the control shaft into rotation as soon as the machining operation carried out by the aforementioned predetermined tool has been completed.

4 Claims, 1 Drawing Figure

PATENTED FEB 13 1973 3,715,939
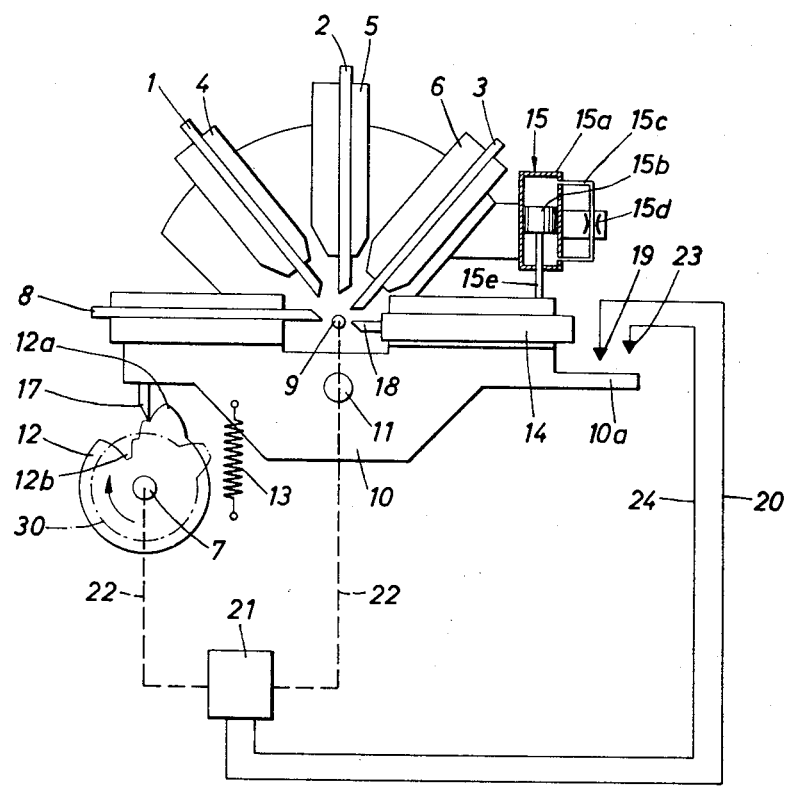

AUTOMATIC LATHE

BACKGROUND OF THE INVENTION

The present invention broadly relates to machine tools and, more specifically, is concerned with a new and improved automatic lathe of the type equipped with a mechanism for bringing to standstill during a work or machining cycle the rotation of a control shaft, this control shaft having at least one cam disc seated thereon for controlling the movement of certain tools.

SUMMARY OF THE INVENTION

A primary object of the present invention relates to a novel construction of machine tool, especially an automatic lathe, wherein it is possible accurately to control the operation of at least one of the machining tools without resorting to complicatedly designed controls.

Still a further significant object of the present invention relates to a novel construction of automatic lathe wherein it is possible to bring reliably to standstill a control shaft carrying one or more control cams thereon, and during such standstill period selectively to control one or more predetermined tools in a precise manner without resorting to the use of complicated and difficult to manufacture control cams.

Still a further significant object of the present invention relates to an automatic lathe wherein at least one tool can be selectively advanced through its feed movement into operable association with a workpiece through the controlled pivotable movement of a rockable element, such as a pivotably mounted balance, during such time as a control shaft is at standstill, and further includes mechanism for controlling the speed of advance of this tool towards the workpiece and/or the duration of the machining operation of such tool upon the workpiece.

Yet a further significant object of the present invention relates to an improved construction of automatic lathe having a novel control for regulating the movement of a given tool in relation to the workpiece being machined, the control being relatively simple in design, economical to manufacture, and affording extreme reliability and precision throughout the required machining operation.

Now in order to implement these and still further objects of the invention, which will become more readily apparent as the description proceeds, the automatic lathe of this invention is of the type incorporating a mechanism rendering possible stoppage of the rotation of a control shaft during a machining or work cycle, this control shaft being equipped with at least one control cam fixedly seated thereon which controls the movement of certain machining tools. According to important aspects of this development the lathe is equipped with a device for performing at least one machining operation by means of at least one predetermined tool during the period of time that the control shaft is at standstill. This device advantageously embodies at least one element for promoting the feed or advancing movement of the tool and also incorporates a mechanism which controls the feed speed of this predetermined tool in the direction of the workpiece or the duration of the machining operation carried out by this tool upon the workpiece. Additionally there is provided response or feeler means, for instance a microswitch, and associated operable connection means in order to place again the control shaft into rotation as soon as there has been completed the machining operation intended to be performed by said predetermined tool.

BRIEF DESCRIPTION OF THE DRAWING

The invention will be better understood and objects other than those set forth above will become apparent when consideration is given to the following detailed description thereof. Such description makes reference to the annexed drawing wherein the single FIGURE schematically illustrates in end view a preferred construction of automatic lathe designed according to the teachings of this invention with associated control means.

DETAILED DESCRIPTION OF THE PREFERRED EMBODIMENT

In the single Figure of the drawing there is shown by way of illustration a preferred embodiment of automatic lathe of the type equipped with a plurality of turning tools, conveniently designated by reference characters 1, 2 and 3, the disposition of these tools 1, 2 and 3 assuming the conventional fanlike arrangement. Each such tool 1, 2 and 3 is supported in known manner by a standard carriage or slide 4, 5 and 6 respectively. Each such carriage 4, 5 and 6 is controlled in the usual fashion by a suitably profiled cam disc, merely schematically represented in phantom lines in the drawing by reference character 30, seated upon control shaft 7. It is here remarked that in considering the structure of the automatic lathe depicted herein only those components thereof especially concerned with the inventive aspects of this development will be described in detail, whereas the other standard components of the lathe will only be briefly referred to for purposes of expounding upon the general arrangement, particularly since the operation of these standard components is well known in this particular art and the details as such are not necessary for fully comprehending the underlying concepts of this invention.

Continuing, it will be observed that at the left-side of the drawing there is schematically illustrated a further turning tool 8 located to one side of the workpiece, typically a stock or rod of material 9 which is to be machined, tool 8 being fixedly seated upon a pivotable or rockable member, here shown as a rocker or balance beam 10. Rocker or balance beam 10 is mounted for pivotal movement through the coaction of the journals or pivot pins 11 at the non-illustrated frame of the lathe which is secured to the usual lathe bed, this frame possessing suitable guides for displaceably guiding carriages 4, 5 and 6. The rocking or pivotal movement of this balance or rocker 10 which is important for the machining operation intended to be carried out by the tool 8 is controlled by a suitably profiled cam disc 12 also seated upon the control shaft 7 along with the previously mentioned cam disc 30. Pivotal movement of the rocker of balance beam 10 can take place, for instance, against the action of a resilient element such as spring 13. A scanning element 17 is fastened to the rocker or balance beam 10 in a position for engagement with the control cam 12, and specifically this scanning element 17 serves to scan the cam profile, and specifically for instance, the raised portion 12a of control cam 12. It will be apparent that when scanner 17 rides upon the raised portion 12a of control cam 12 the pivotably mounted balance or rocker 10 will be rocked in clockwise direction, against the restraining force of the spring 13, this occurring during such time as tool 8 carries out its specific machining operation.

With the foregoing background in mind, attention is now invited to the opposite side of the workpiece 9 where it will be seen that the rocker or balance 10 carries a predetermined machining device 14, for instance a thread chaser of conventional construction. Thread chaser 14 may be of the type set forth in U.S. Pat. No. 3,199,385 of Andre Bechler, granted Aug. 10, 1965, wherein there are disclosed details of this particular type of machining apparatus and the control mechanism for imparting the standard movements to the thread chasing tool 18 transversely and lengthwise of the workpiece or rod stock 9. The effective machining time of such machining device 14, namely such supposed thread chaser, is assumed to be quite long and the position of the associated tool, for instance the thread chasing tool 18, must only be precisely determined at the end of the machining operation. On the assumption that the machining operation of this machining device 14 is quite long it should be apparent that the requisite control of the pivotal movement of the rocker or balance 10 will unnecessarily require a very large part of the periphery of the cam disc 12, in other words one revolution of the control shaft 7 and the other cams, such as the cam discs 12, 30 secured to such control shaft. These cam discs and the raised cam portions, such as the portion 12a, could only then be properly profiled with extreme difficulty since their operable times for the associated tools 1, 2, 3 and 8 must be limited to a very small part of the periphery of the associated cam discs. Now one of the primary aims of this development is to overcome this drawback and to avoid the necessity of controlling the rocking or pivotal movements of the rocker 10 and therewith the feed movement of the machining device 14 through a complicated configured cam profile. Instead there is provided a completely novel and much simpler control of this movement of the rocker and balance beam and the therewith associated machining device 14 which, in fact, is not dependent upon the rotation of the control shaft 7 nor upon complicated profiled cam means carried thereon.

Hence, in order to overcome the previously explained drawbacks the invention contemplates stopping the rotation of the control shaft 7 together with the cam discs carried thereby, and specifically shortly after the machining device 14 has become effective. This situation is attained as soon as during rotation of the cam disc 12 its recess 12b is located in a position opposite the cam scanner 17. When this relative position of the depression or recess 12b of cam 12 and scanner 17 has been established, the rocker or balance beam 10 is free to rock in counterclockwise direction owing to the action of the force exerted by the spring 13. Due to this counterclockwise pivoting of rocker 10 its nose-like projection 10a can act upon a suitable response or feeler mechanism for stopping the control shaft 7, and specifically a microswitch 19 which through the agency of electrical control connections or leads 20 acts upon a suitable coupling 21 for the purpose of disengaging same. This coupling 21 can be arranged at the driving connection, schematically illustrated by phantom lines 22, which prevails in the usual way between the non-illustrated workpiece support spindle and the control shaft 7. Therefore, it will be readily understood that whenever the coupling 21 is disengaged in response to actuation of the microswitch 19 the driving connection between the control shaft 7 and the workpiece support spindle is interrupted so that control shaft 7 is brought to standstill.

In view of the fact that the depression 12b of the cam 12 is maintained in confronting relationship with respect to the scanner 17 is will be readily apparent that the rocker or balance 10 is no longer controlled by the cam disc 12 and now only an actuation mechanism, here shown as the spring 13, acts upon the rocker 10 for effecting the feed of the tool 18 associated with machining device 14. In other words, it will be seen as the spring 13 pivots the rocker or balance 10 in the counterclockwise direction the tool 18 will be fed or advanced towards the workpiece 9. This actuating means 13 furthermore cooperates with a suitable mechanism 15 serving to limit the speed of feed or advance of the tool 18. It has already been mentioned that the actuating mechanism may be a spring 13 although other suitable means for applying a force producing a rocking or pivotal movement upon the rocker 10 and feed of the tool 18 could be provided.

By the same token it is here mentioned that the mechanism 15 which serves to limit the feed of advance of the tool 18 in the direction of the workpiece 9, in other words limits the speed of rocking or pivotal movement of the rocker or balance 10, can be a suitable delay mechanism 15 which, for instance, as schematically illustrated, can embody a fluid-operated cylinder 15a in which controllably reciprocates a piston 15b, whereby the cylinder chambers located at opposite faces of the piston 15b are placed in flow communication with one another by a suitable conduit 15c having operably associated therewith an adjustable throttle element 15d for throttling the flow of fluid medium from the side of one piston face to the opposite piston face. Assuming that the throttle element 15d has been adjusted for a certain desired throughflow of the fuid medium contained in the cylinder 15a, then during the upward counterclockwise movement of the right-side of the balance beam 10 the piston rod 15e will be urged upwardly, thereby similarly displacing the piston 15b towards the upper top end of the cylinder 15a. This will obviously force fluid contained in the upper cylinder chamber or compartment through the conduit 15c and under the control of the throttling element or valve 15d into the lower chamber of cylinder 15a. Owing to this regulated flow of the fluid medium the rocking movement of the balance beam or rocker 10 can be correspondingly controlled, and thus, also the feed movement of tool 18 with regard to the workpiece 9 and/or similarly the duration of the machining operation carried out by tool 18 upon the workpiece 9.

Now as soon as the machining operation performed by the tool 18, for instance the thread chasing operation, has terminated, then the scanner 17 will come to bear upon the floor of the depression or recess 12b of cam disc 12 for the purpose of more precisely ascertaining the terminal position of the tool 18. During the final phase of its pivotal movement, brought about by the action of the spring 13 in conjunction with the delay mechanism 15, the nose-like projection 10a of the rocker 10 will then act upon a further response or feeler, namely a second microswitch 23 or other suitable device, which then through the agency of the electrical control connection 24 will ensure for the renewed engagement of coupling 21. Consequently, control shaft 7 is then again placed into operable driving association with the workpiece support spindle and the driving connection 22 between these components is re-established so that rotation of the control shaft 7 by the workpiece support spindle is carried out in the usual way.

Form what has been explained above it will be seen that owing to the novel design of lathe as contemplated by this invention, it is possible to control a given machining operation, such as the thread chasing operation performed by the chaser 14, without relying upon rotation of the control shaft and especially designed cam profiles which are difficult to machine and usually of extremely complicated shape, particularly when such machining operation extends over a relatively long period of time. Here it will be seen that the primary feed and operation of the chasing tool 18 is simply brought about by the controlled rocking movement of the balance or rocker 10 which is under the influence of the actuating means, namely the spring 13 and the controllable delay mechanism 15.

While there is shown and described present preferred embodiments of the invention, it is to be distinctly understood that the invention is not limited thereto but may be otherwise variously embodied and practiced within the scope of the following claims. Accordingly,

What is claimed is:

1. An automatic lathe comprising a control shaft equipped with at least one cam disc fixedly seated thereon for controlling the movement of certain tools, means for bringing to standstill the rotation of said control shaft during a machining cycle, at least one machining tool for carrying out a predetermined machining operation during standstill of said control shaft, means operatively connected with said at least one machining tool for carrying out at least one machining operation by means of said at least one machining tool during standstill of said control shaft, said last-mentioned means incorporating at least one element for bringing about the feed movement of said at least one machining tool and mechanism for determining the speed of feed of said at least one machining tool or the duration of the machining operation carried out by said at least one machining tool, feeler means acted upon by said means for carrying out said at least one machining operation during standstill of the control shaft, said feeler means cooperating with said means for bringing to standstill the rotation of said control shaft in order again to place such control shaft into rotation as soon as said at least one machining tool has completed its machining operation.

2. The automatic lathe as defined in claim 1, wherein said means for carrying out said at least one machining operation during standstill of the control shaft by means of said at least one machining tool embodies a pivotably mounted rocker, and wherein said element bringing about the feed of said at least one machining tool embodies a spring acting upon said rocker.

3. The automatic lathe as defined in claim 1, wherein said means for bringing to standstill the rotation of said control shaft incorporates a coupling which can be selectively engaged and disengaged, and a microswitch responsive to movement of said rocker for disengaging said coupling.

4. The automatic lathe as defined in claim 2, wherein said feeler means comprises a microswitch responsive to rocking movement of said rocker for engaging said coupling upon completion of the machining operation by said at least one machining tool.

* * * * *